(12) United States Patent
Furuhashi et al.

(10) Patent No.: US 12,456,488 B2
(45) Date of Patent: Oct. 28, 2025

(54) HEAT ASSISTED MAGNETIC RECORDING AND REPRODUCING DEVICE AND ADJUSTMENT METHOD OF THE SAME

(71) Applicants: Kabushiki Kaisha Toshiba, Tokyo (JP); Toshiba Electronic Devices & Storage Corporation, Tokyo (JP)

(72) Inventors: Takao Furuhashi, Kawasaki Kanagawa (JP); Kaori Kimura, Yokohama Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/922,977

(22) Filed: Oct. 22, 2024

(65) Prior Publication Data

US 2025/0046338 A1 Feb. 6, 2025

(30) Foreign Application Priority Data

May 14, 2024 (JP) .................. 2024-078571

(51) Int. Cl.
| | | |
|---|---|---|
| *G11B 5/60* | (2006.01) | |
| *G11B 5/41* | (2006.01) | |
| *G11B 5/596* | (2006.01) | |
| *G11B 5/00* | (2006.01) | |

(52) U.S. Cl.
CPC .. *G11B 5/59627* (2013.01); *G11B 2005/0021* (2013.01)

(58) Field of Classification Search
CPC ........... G11B 5/41; G11B 5/012; G11B 5/314; G11B 5/3133; G11B 5/71; G11B 5/82; G11B 2005/0021; G11B 5/575; G11B 5/6011; G11B 5/6088
USPC ........................................... 360/59
See application file for complete search history.

(56) References Cited

U.S. PATENT DOCUMENTS

| | | | |
|---|---|---|---|
| 9,922,676 | B1 | 3/2018 | Schreck et al. |
| 10,529,364 | B2 | 1/2020 | Brand et al. |
| 10,614,850 | B1 * | 4/2020 | Jones ............ G11B 5/012 |
| 12,223,988 | B1 | 2/2025 | Kimura |
| 2018/0233168 | A1 | 8/2018 | Brand et al. |
| 2025/0104736 | A1 | 3/2025 | Furuhashi et al. |

FOREIGN PATENT DOCUMENTS

| | | |
|---|---|---|
| JP | S63-91815 A | 4/1988 |
| JP | 2025-44548 A | 4/2025 |
| JP | 2025-49818 A | 4/2025 |

OTHER PUBLICATIONS

U.S. Appl. No. 18/594,478, filed Mar. 4, 2024.
U.S. Appl. No. 18/596,531, filed Mar. 5, 2024.

\* cited by examiner

*Primary Examiner* — Nabil Z Hindi
(74) *Attorney, Agent, or Firm* — Kim & Stewart LLP

(57) ABSTRACT

According to one embodiment, a method of adjusting a heat assisted magnetic recording and reproducing device maintains a heat assisted magnetic recording head of the heat assisted magnetic recording and reproducing device in an on-track state, maintains a recording current for data recording below a threshold value, and applies a light source drive current emitting light to a light source.

9 Claims, 7 Drawing Sheets

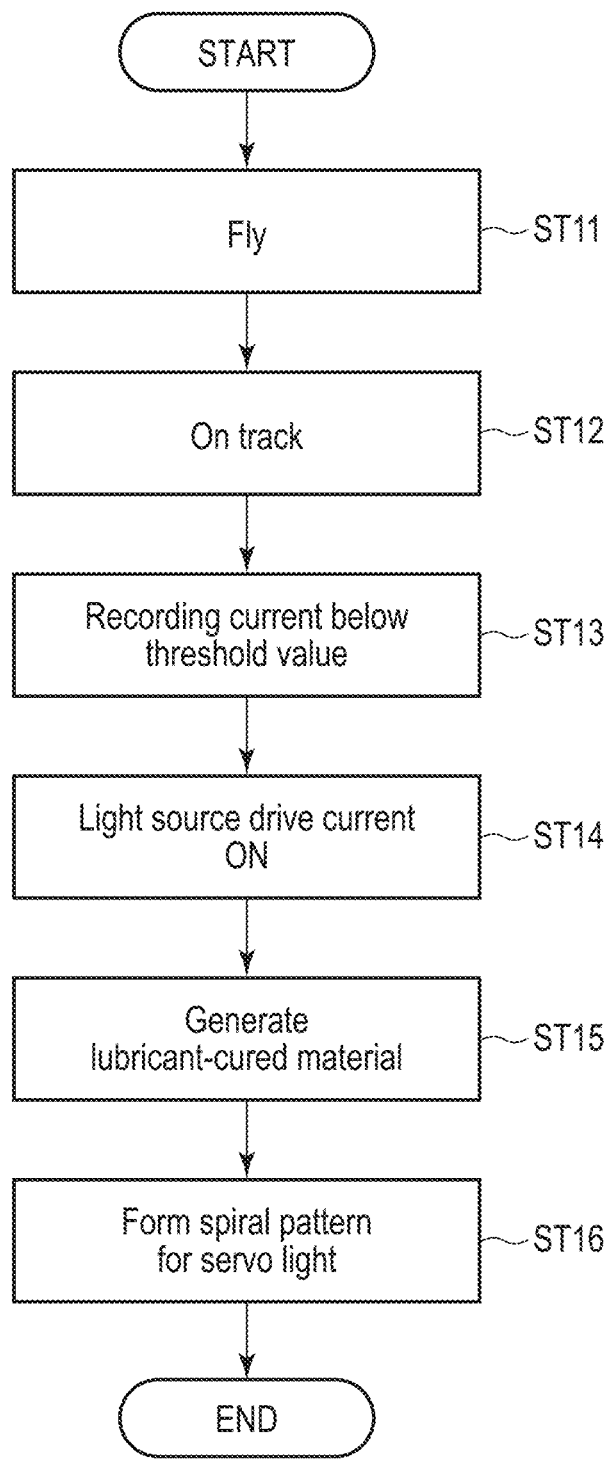
F I G. 8

HEAT ASSISTED MAGNETIC RECORDING AND REPRODUCING DEVICE AND ADJUSTMENT METHOD OF THE SAME

CROSS-REFERENCE TO RELATED APPLICATIONS

This application is based upon and claims the benefit of priority from Japanese Patent Application No. 2024-078571, filed May 14, 2024, the entire contents of which are incorporated herein by reference.

FIELD

Embodiments described herein relate generally to a heat assisted magnetic recording and reproducing device and an adjustment method of the same.

BACKGROUND

In a heat-assisted magnetic recording head, the temperature of a magnetic disk is raised for recording by laser. It is known that, at this time, components considered to originate from a magnetic film of the magnetic disk adhere to a tip of a near-field transducer (NFT) via a lubricant and generate a cured material, due to the temperature rise.

The generation of the lubricant-cured material cannot be prevented on the principle of recording. In contrast, it is known that when the lubricant-cured material adheres, the transmittance of the laser is increased and the material acts as a layer which improves a transmission efficiency of the laser.

The lubricant-cured material is scraped off by wear if a flying height is lowered, or is built up again by the lubricant filling a head-media interface if the flying is increased. For this reason, a problem arises that when the flying height fluctuates within a disk surface, for example, when the head moves from a track with a low fly to a track with a high fly, the write performance is degraded until the lubricant-cured material is generated.

BRIEF DESCRIPTION OF THE DRAWINGS

FIG. 8 is a flowchart showing another example of the method of controlling the magnetic recording and reproducing device according to the first embodiment.

DETAILED DESCRIPTION

Figure 1:
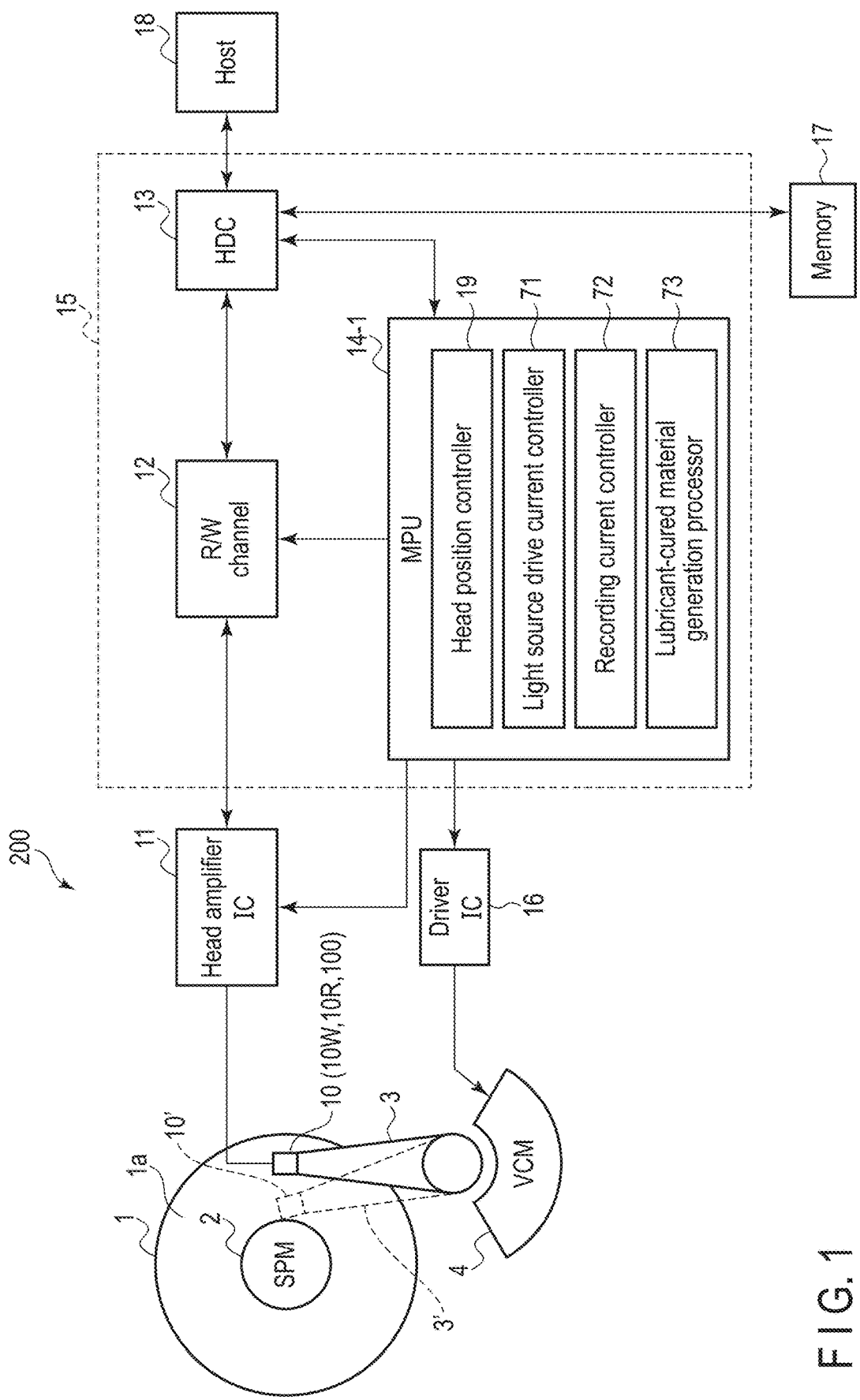
FIG. 1 is a block diagram showing a configuration of an example of a magnetic recording and reproducing device according to a second embodiment.

In general, according to on first embodiment, a method of adjusting a heat assisted magnetic recording and reproducing device maintains a heat assisted magnetic recording head of the heat assisted magnetic recording and reproducing device in an on-track state, maintains a recording current for data recording below a threshold value, and applies a light source drive current emitting light to a light source. The used heat assisted magnetic recording and reproducing device incorporates a heat assisted magnetic recording head which comprises a near-field transducer generating near-field light, a waveguide transmitting light to the near-field transducer, and a light source supplying light to the waveguide, and a heat assisted magnetic recording medium which is provided to face the heat assisted magnetic recording head and in which a lubricant layer is provided on a recording surface facing the heat assisted magnetic recording head.

According to a second embodiment, a heat assisted magnetic recording and reproducing device is a device which can be used in the adjustment method according to the first embodiment, and incorporates: a heat assisted magnetic recording head which comprises a main pole, a near-field transducer generating near-field light, a waveguide transmitting light to the near-field transducer, and a light source supplying light to the waveguide; a heat assisted magnetic recording medium which comprises a lubricant layer on a recording surface facing the heat assisted magnetic recording head; a head position controller maintaining the heat assisted magnetic recording head in an on-track state; a recording current controller controlling a data recording current to be applied to the heat assisted magnetic recording head; a light source drive current controller controlling a light source drive current to be applied to the light source; and a lubricant-cured material generation processor performing a process of applying the light source drive current to the light source and generating a lubricant-cured material at a distal portion of the near-field transducer while controlling the data recording current below a threshold value.

According to the first and second embodiments, by using a heat assisted magnetic recording head when using a lubricant-cured material and maintaining a recording current for data recording below a threshold value when applying a light source drive current to a light source, a recording layer and a lubricant layer in the vicinity of a near-field transducer can be locally heated to provide a lubricant-cured material, an influence on areas other than an area where the lubricant-cured material is formed can be minimized, and data recording, pattern formation, or the like can be performed without degrading the recording and reproducing performance. In addition, it is possible to shorten as much as possible the time required for the lubricant to be filled in the gap between the distal end of the NFT and the magnetic recording medium according to the head flying amount in the on-track state, i.e., the time in which the recording performance is degraded, by providing the lubricant-cured material in advance.

Embodiments will be described hereinafter with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

EXAMPLES

Embodiments will be described hereinafter with reference to examples.

First, a configuration of an example of a disk drive according to a second embodiment will be described with reference to FIG. 1. Incidentally, the configuration of the disk drive shown in FIG. 1, which is a magnetic recording and reproducing device, is also applicable to each of the embodiments described below.

As shown in FIG. 1, a disk drive 200 is a magnetic disk drive of a perpendicular magnetic recording scheme, incorporating a magnetic disk 1 that is a perpendicular magnetic recording medium and a magnetic head 10 including a magnetic flux control layer to be described later.

Figure 2:
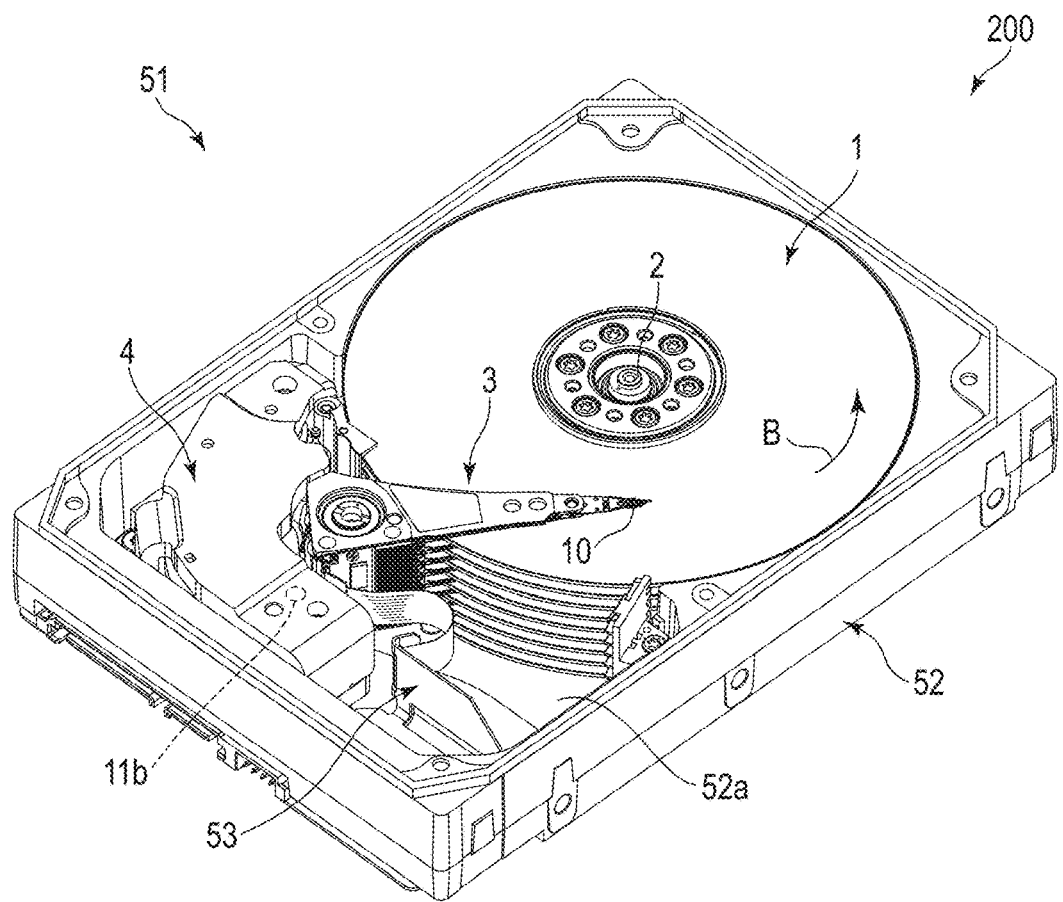
FIG. 2 is a partially exploded perspective view showing the magnetic recording and reproducing device according to the second embodiment.

FIG. 2 is a partially exploded perspective view showing the magnetic recording and reproducing device according to the second embodiment.

FIG. 2 illustrates a state in which a plurality of magnetic disks 1 and a plurality of magnetic heads 10 are housed in a housing 51 in the magnetic recording and reproducing device according to the second embodiment, and a lid portion is omitted.

The magnetic disks 1 are fixed to a spindle motor (SPM) 2 and mounted to make rotational motion. The magnetic heads 10 are mounted on an actuator 3 and are configured to move in a radial direction on the magnetic disks 1. The actuator 3 is driven to rotate by a voice coil motor (VCM) 4. A columnar inner stopper 11b can be provided on a bottom wall 52a around the voice coil motor (VCM) 4 and formed of, for example, a synthetic adsorbent material. By using the inner stopper 11b, the impact of the actuator 3 moving and hitting the column of the VCM when moving the head to the inner circumference of the magnetic disk 1 cam be suppressed. In FIG. 1, for example, the magnetic head 10 is sought to any position on the recording surface 1a, and a magnetic head 10' mounted on an actuator 3' is fixed while pressing the inner stopper 11b. The magnetic head 10 comprises a write head 10W, a read head 10R, and a thermal assist unit 100. The write head 10W writes data to the magnetic disk 1. The read head 10R reads data from the magnetic disk 1. The thermal assist unit 100 assists in writing data when the write head 10W writes data to the magnetic disk 1. The magnetic head 10 can include one or more magnetic heads.

Furthermore, the disk drive includes a head amplifier integrated circuit (hereinafter referred to as a head amplifier IC) 11, a read/write channel (R/W channel) 12, a hard disk controller (HDC) 13, a microprocessor (MPU) 14-1, a driver IC 16, and a memory 17. The R/W channel 12, the HDC 13, and the MPU 14-1 are incorporated into a controller 15 which consists of a single-chip integrated circuit.

The head amplifier IC 11 includes a circuit group for driving a laser diode for thermal assist, as described below. Furthermore, the head amplifier IC 11 includes a driver that supplies to the recording head 10W a recording signal (write current) corresponding to the write data supplied from the R/W channel 12. In addition, the head amplifier IC 11 also includes a read amplifier that amplifies the read signal output from the reproducing head 10R and transmits the read signal to the R/W channel 12.

The R/W channel 12 is a signal processing circuit of the read/write data. The HDC 13 constitutes an interface between the disk drive and a host 18, and executes transfer control of the read/write data.

The MPU 14-1 is a main controller of the disk drive and executes servo control necessary for controlling read/write operations and positioning the magnetic head 10. Furthermore, the MPU 14-1 includes a head position controller 19 that maintains the heat assisted magnetic recording head 10 in an on-track state, a light source drive current controller 71 that controls a light source drive current applied to a light source, a recording current controller 72 that controls a data recording current applied to the heat assisted magnetic recording head, and a lubricant-cured material generation processor 73 that performs a process of applying the light source drive current to the light source and generating a lubricant-cured material at a distal portion of a near-field transducer while controlling the data recording current below a threshold value.

The memory 17 includes a buffer memory and a flash memory composed of DRAM, and the like.

Figure 3:
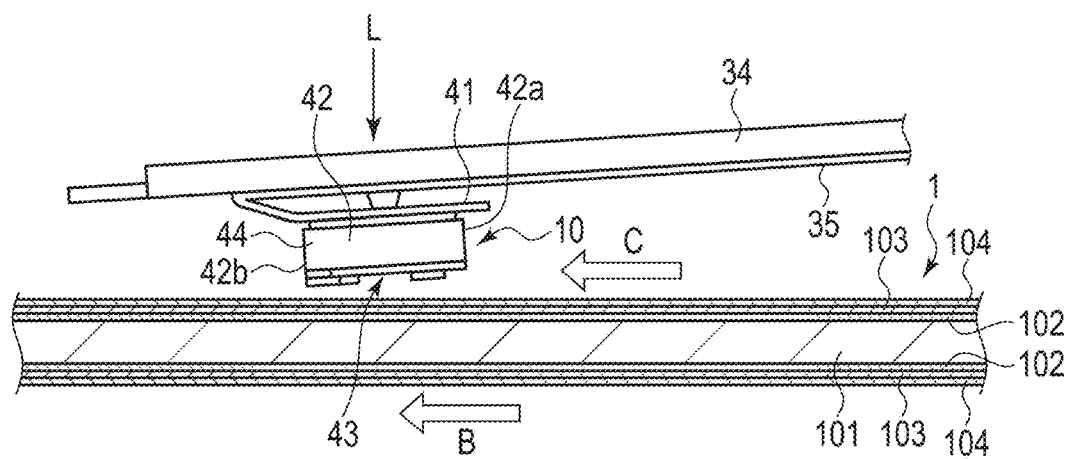
FIG. 3 is a side view showing a magnetic head and a suspension.

FIG. 3 is a side view showing the magnetic head 10 and a suspension.

As shown in FIG. 3, each magnetic head 10 is configured as a flying head, and includes a slider 42 having a shape of a substantially rectangular parallelepiped and a recording and reproducing head unit 44 provided at an outflow end (trailing end) of the slider 42. The magnetic head 10 is fixed to a gimbal spring 41 provided at a distal portion of a suspension 34. A head load L toward the surface of the magnetic disk 1 is applied to each magnetic head 10 by the elasticity of the suspension 34. As shown in FIG. 2, each magnetic head 10 is connected to the head amplifier IC 11 and the HDC 13 via the suspension 34 and a wiring member (flexure) 35 fixed on the arm.

Next, the structure of the magnetic disk 1 and the magnetic head 10 will be described in detail.

Figure 4:
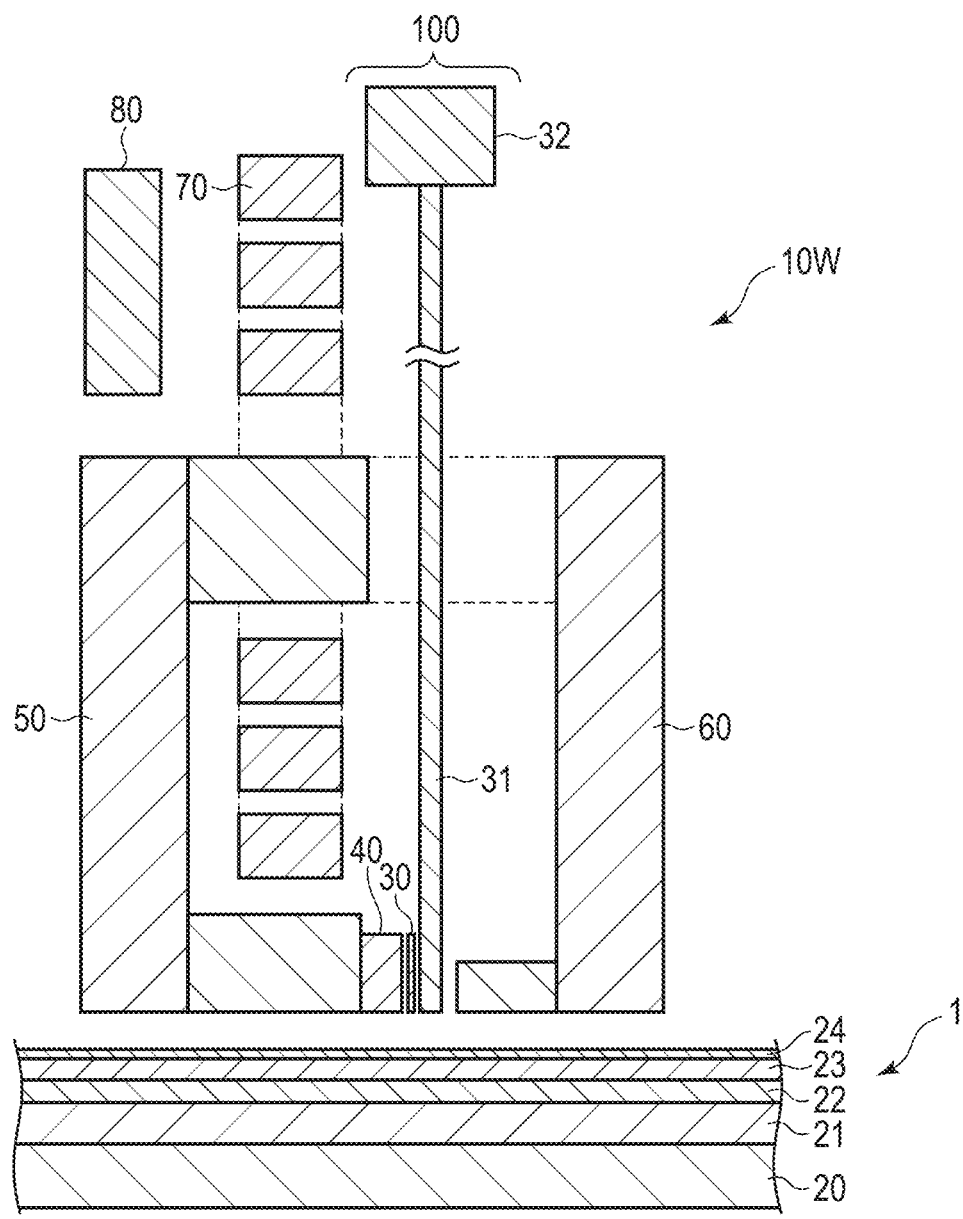
FIG. 4 is a partially transverse cross-sectional view showing the magnetic recording and reproducing device according to the second embodiment.

FIG. 4 is a transverse cross-sectional view showing the write head 10W and the magnetic disk 1, which are parts of the magnetic disk drive.

The magnetic disk 1 includes a substrate 20, and a heat sink layer 21, a crystal orientation layer 22, a perpendicular recording layer 23, and a protective layer 24 having a surface coated with a lubricant, which are stacked in order on the substrate 20. The perpendicular recording layer 23 has a large anisotropy perpendicular to a disk surface. The crystal orientation layer 22 is provided under the perpendicular recording layer 23 to improve the orientation of the perpendicular recording layer 23. The heat sink layer 21 is provided under the crystal orientation layer 22 to suppress the spread of the heating area. The protective film 24 is provided on an upper part of the perpendicular recording layer 23 to protect the perpendicular recording layer 23.

The magnetic head 10 is a separated magnetic head in which the recording head 10W and the reproducing head 10R are separated. The recording head 10W is composed of a main pole, 40 formed of a high permeability material that generates a magnetic field perpendicular to the disk surface, a trailing yoke 50 magnetically bonded to the main pole, that flows a magnetic flux to the main pole, 40, a return shield magnetic pole 60 provided to efficiently close a magnetic path directly under the main pole, which is arranged on a leading side of the main pole, 40, a coil 70 arranged to wrap around the magnetic path including the trailing yoke and the return shield magnetic pole to pass the magnetic flux to the main magnetic pole 40, a heater 80 for controlling the height of flying of the recording head, a near-field transducer 30 that generates near-field light to heat the perpendicular recording layer 23 of the magnetic disk 1 on the leading side of the main pole, 40, and a waveguide 31 that propagates the light for generating the near-field light. A laser diode is incorporated as the light source 32 in a form of being mounted on a slider of the actuator assembly 3.

The recording current applied to the coil 70 can be suppressed below a threshold value according to the recording current information from the recording current controller 72 in FIG. 1. The light source drive current to the light source 32 can be applied based on the light source drive current information from the light source drive current controller 71 of FIG. 1.

The near-field transducer 30 can be formed of, for example, Au, Pd, Pt, Rh, or Ir, or an alloy consisting of a combination of some of these. An insulating layer provided between the main pole, and the near-field transducer can be formed of, for example, an oxide consisting of $SiO_2$, $Al_2O_3$, or the like.

Examples of the recording methods for heat-assisted magnetic recording that can be used in the magnetic disk device 200 include so-called Conventional Magnetic Recording (CMR) for writing data in tracks at intervals in the radial direction and performing recording such that adjacent tracks do not overlap, so-called Shingled Magnetic Recording (SMR) including tracks stacked in order in the radial direction and recording over parts of the adjacent tracks, or so-called Interlaced Magnetic Recording (IMR) including a bottom track and a top track in which adjacent tracks are stacked alternately and, after recording on the bottom track, recording while stacking the bottom track on the interlaced top track, or a combination of these methods.

Figure 5:
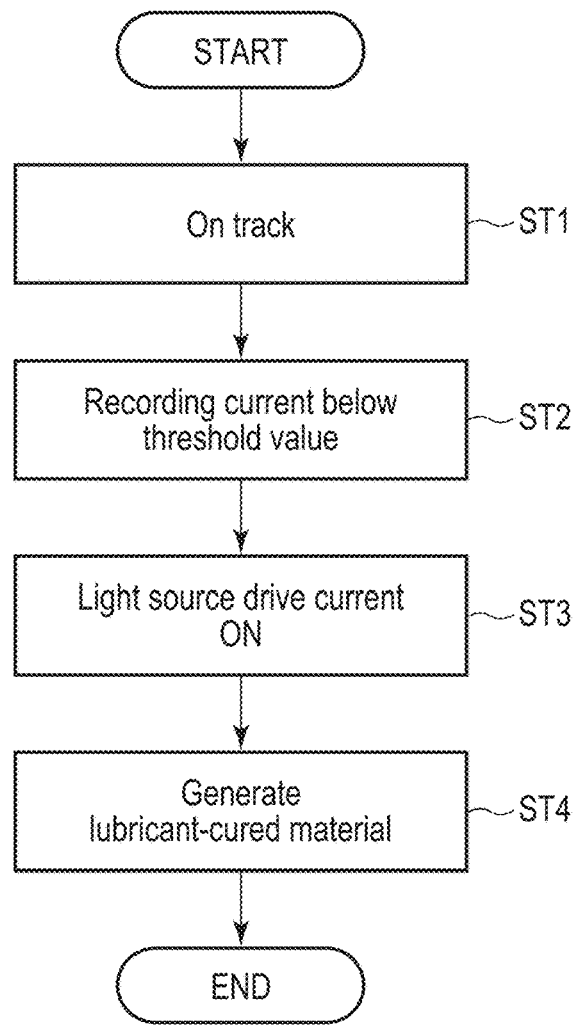
FIG. 5 is a flowchart showing an example of a method of controlling a magnetic recording and reproducing device according to a first embodiment.

FIG. 5 shows an example of a flowchart showing a control method of the magnetic recording and reproducing device according to the first embodiment.

Figure 6:
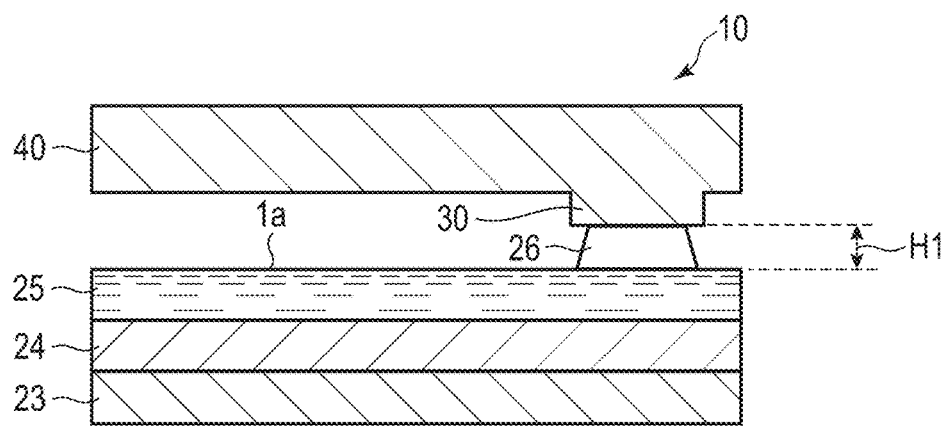
FIG. 6 is a model diagram illustrating a lubricant-cured material.

FIG. 6 shows a model diagram representing a lubricant-cured material formed on the heat-assisted magnetic recording head.

As shown in FIG. 5, first, a heat-assisted magnetic recording head 10 comprising the NFT 30 and the main pole, 40 at its distal portion is made to fly and is maintained in the on-track state on the magnetic disk 1 comprising the magnetic recording layer 23, the protective layer 24, and the lubricant layer 25 applied on the protective layer 24 at a head flying height of height H1 (ST1), and the lubricant is filled in the gap between the NFT 30 at the distal portion and the lubricant layer 25 of the magnetic recording medium. Then, in response to the lubricant-cured material generation processing information from the lubricant-cured material generation processor 73, suppressing the recording current applied to the coil 70 below a threshold value is maintained (ST2), while applying the light source drive current to the light source 32 is maintained for a certain time (ST3), and the recording layer and the lubricant in the vicinity of NFT 30 are locally heated to generate a lubricant-cured material (ST4).

As a result, the lubricant filled in the distal portion of the NFT 30 from the lubricant layer 25 is cured and the lubricant hardened material 26 having the first height H1 can be adhered to the heat-assisted magnetic recording head 10, as shown in FIG. 6, while minimizing the influence on the areas other than the area where the lubricant-cured material is formed.

The generation of the lubricant-cured material can be performed before and after shipment of the heat assisted magnetic recording and reproducing device, in the user environment, at timing other than the time of data recording. In addition, the generation of the lubricant-cured material can be performed in any area other than the data recording area, or the like.

The areas other than the data recording area include, for example, the servo recording area, the defect area avoiding protrusions that may cause head degradation, the band area of shingled magnetic recording (SMR), the area in the system area where writes may be performed, for example, areas where the head degradation is checked, areas that are used as reserve areas for some reason, and the like, and reserve areas reserved for SMR media cache and adjacent track interference (ATI) rewrite, or reserve areas reserved for future late-defects, and the like, which are defined to improve performance.

Figure 7:
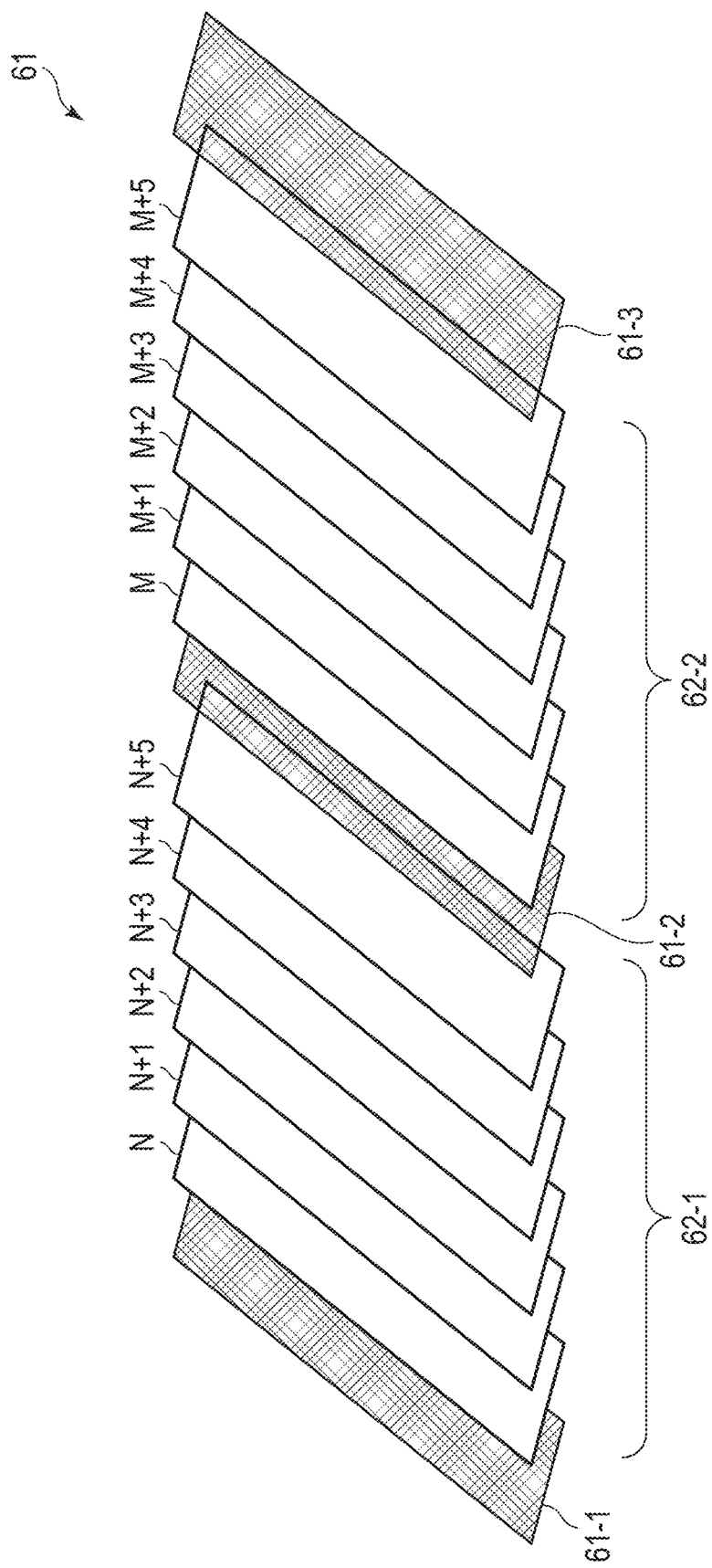
FIG. 7 is a diagram illustrating an example of areas other than a data recording area.

FIG. 7 shows a model diagram representing the guard band as a band area for shingled magnetic recording (SMR) as a diagram illustrating an example of an area other than the data recording area.

As shown in the drawing, a guard band 61-2 is provided between one band 62-1 and the adjacent band 62-2 of the shingled magnetic recording, and shingled tracks N, N+1, N+2, N+3, N+4, and N+5 are provided in the band 62-1. The guard band 61-2 is also provided with shingled tracks M, M+1, M+2, M+3, M+4, and M+5 on the band 62-2. The guard band 61-2 is separated from track N+5 and track M on both sides in a short distance and is not shingled. A guard band 61-1 is provided on a side opposite to the guard band 61-2 through the band 62-1 of the shingled magnetic recording, a guard band 61-3 is provided on a side opposite to the guard band 61-2 through the band 62-2 of the shingled magnetic recording, and each of the guard bands is separated from the tracks on both sides in a small distance and is not shingled.

Examples of timing other than the timing for data recording include, for example, the timing before writing servo information such as self-servo write, timing when the device is idle for more than a certain period of time, once in a certain period of time, the background of data recording, and the like.

Before shipping the heat assisted magnetic recording and reproducing device, the lubricant-cured material can be formed at the timing before forming, for example, a reference servo pattern for servo writes such as a concentric or spiral pattern, on the recording surface of the heat assisted magnetic recording medium, as the timing other than the timing for data recording. The deterioration of read-write characteristics caused by the lubricant-cured material at the time of subsequent reference pattern formation can be thereby prevented. In addition, the on-track condition to the reference servo pattern can be maintained during subsequent servo writes without causing any problems.

The recording current is the current that can be used for data recording and is, for example, the current applied to the magnetic coil of the recording head during data recording. A threshold value of the recording current can be reduced to a small current that does not cause the magnetic recording layer of the magnetic recording medium to perform a magnetization reversal. For example, the threshold value of the recording current can be greater than 0 and less than or equal to 17 mA. If the threshold value exceeds 17 mA, the current tends to be small enough to cause the magnetic recording layer of the magnetic recording medium to perform the magnetization reversal. In addition, the recording current can be set to 0 and, at this time, the recording current is in the OFF state.

The light source drive current refers to the current that makes the light source emit light. For example, a laser light source and the like can be used as a light source.

The time to maintain applying the light source drive current to the light source 32 while keeping the recording current suppressed within the threshold value can be maintained for at least 4 milliseconds, or 10 seconds in longer cases.

Example 1

Example 1 shows an example of generating a lubricant-cured material before forming a concentric or spiral reference servo pattern for servo light on the recording surface.

FIG. 8 shows another example of a flowchart showing a control method of the magnetic recording and reproducing device according to the first embodiment.

First, the head 10 is made to fly in the area where the reference servo pattern is formed on the recording surface (ST11). Before making the head 10 fly, the timing of generating the lubricant-cured material in areas other than the data area can be determined as needed. Next, the recording head is fixed by pressing the inner stopper 11*b* or a head used for recording is fixed by on-tracking the other head facing the other recording surface, among a plurality of magnetic heads 10, to the spiral or servo pattern, thereby maintaining the on-track state (ST12). Then, while the recording current is suppressed below a threshold value or, for example, the recording current is turned off in this example (ST13), the light source drive current of the recording head 10 is turned on (ST14) and maintained for a certain time to generate the lubricant-cured material in the vicinity of an NFT 31 of the recording head 10W (ST15). After that, a concentric or spiral reference servo pattern for servo light is formed (ST16).

According to Example 1, as shown in ST13 and ST14, since the light source drive current of the recording head is turned on while the recording current is suppressed below the threshold value or, for example, the recording current is turned off in this example, to generate the lubricant-cured material in the vicinity of the NFT of the recording head, before forming the concentric or spiral reference servo pattern for servo light, the lubricant-cured material can be generated by minimizing the influence on areas other than the area where the reference servo pattern is formed. As a result, it is possible to shorten as much as possible the time required for the lubricant to be filled in the gap between the distal end of the NFT and the magnetic recording medium according to the head flying amount in the on-track state, i.e., the time in which the recording performance is degraded, and to perform data recording or pattern formation without degrading the recording and reproducing performance in areas other than the area where the lubricant-cured material is formed. Incidentally, ST13 and ST14 can be performed simultaneously or in reverse order.

In contrast, if the recording current is not suppressed below the threshold value, the areas other than the area where the reference servo pattern is formed are adversely affected and, when the spiral reference servo pattern for servo write is formed, the on-track state cannot be maintained, and the generation of the reference servo pattern tends to become difficult.

Example 2

Example 2 shows an example of generating the lubricant-cured material in the user environment after shipment.

Figure 9:
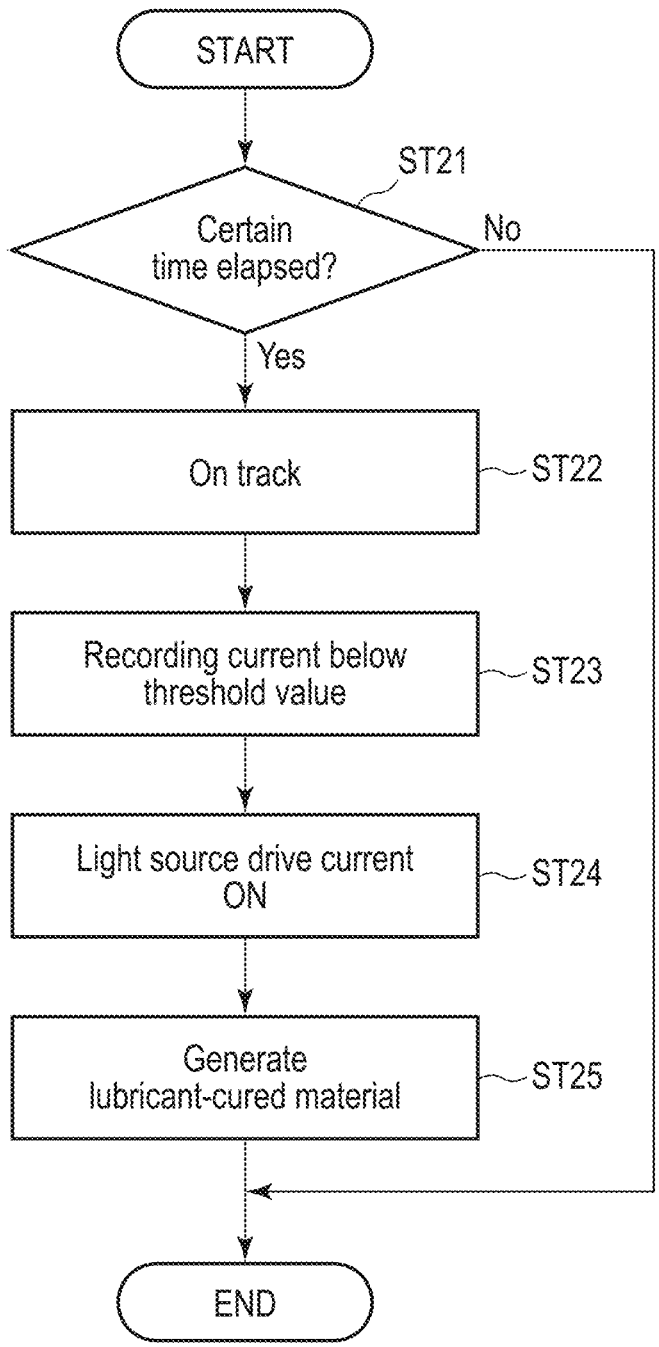
FIG. 9 is a flowchart showing another example of the method of controlling the magnetic recording and reproducing device according to the first embodiment.

FIG. 9 shows yet another example of the flowchart showing the method of controlling the magnetic recording and reproducing device according to the first embodiment.

The heat assisted magnetic recording and reproducing device is placed in a user environment. First, it is determined whether a certain period of time has elapsed in a state of receiving no commands from the host 18 (ST21) and, if a certain period of time has not elapsed, the process ends as it is. If a certain period of time has elapsed, the recording head 10 is moved to, for example, a defect registration point or an SMR band position and is maintained in the on-track state (ST22). The defect registration point refers to a point in the magnetic recording medium where data cannot be recorded. Among the defect registration points, a protrusion point can be avoided due to risk on head deterioration. While the recording current is suppressed below a threshold value or, for example, the recording current is turned off in this example (ST23), the light source drive current of the recording head 10 is turned on (ST24) and maintained for a certain time, and the lubricant-cured material is generated in the vicinity of the NFT 31 of the recording head 10W and the generation is ended (ST25).

According to Example 2, as shown in ST23 and ST24, in the user environment, since the light source drive current of the recording head is turned on while the recording current is suppressed below the threshold value or, for example, the recording current is turned off to generate the lubricant-cured material in the vicinity of the NFT of the recording head, at the defect registration point or SMR band position, an influence on the areas other than the defect registration point or the SMR band position can be minimized and the lubricant-cured material can be generated. As a result, it is possible to shorten as much as possible the time required for the lubricant to be filled in the gap between the distal end of the NFT and the magnetic recording medium according to the head flying amount in the on-track state, i.e., the time in which the recording performance is degraded, and to perform data recording or pattern formation without degrading the recording and reproducing performance in areas other than the area where the lubricant-cured material is formed.

In contrast, if the recording current is not suppressed below the threshold value, areas other than the defective registration point or the SMR band position may be adversely affected, making it difficult to maintain the on-track state during recording.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of adjusting a heat assisted magnetic recording and reproducing device incorporating a heat assisted magnetic recording head which comprises a main pole, a near-field transducer generating near-field light, a waveguide transmitting light to the near-field transducer, and a light source supplying light to the waveguide, and a heat assisted magnetic recording medium which comprises a lubricant layer on a recording surface facing the heat assisted magnetic recording head, the method comprising:

maintaining the heat assisted magnetic recording head in an on-track state; and maintaining a recording current for data recording below a threshold value, for the heat assisted magnetic recording head, applying a light source drive current for emitting light to the light source, and generating a lubricant-cured material at a distal end of the near-field transducer.

2. The method of claim 1, wherein
the threshold value is greater than 0 and less than or equal to 17 mA.

3. The method of claim 1, wherein
the recording current is 0.

4. The method of claim 1, further comprising:
forming the lubricant-cured material and then forming a concentric or spiral reference servo pattern for servo writes on the recording surface.

5. The method of claim 1, further comprising:
adjusting the heat assisted magnetic recording and reproducing device in a user environment.

6. The method of claim 1, wherein
the maintaining the heat assisted magnetic recording head in the on-track state includes moving the heat assisted magnetic recording head to a defect registration spot or an SMR band position.

7. The heat assisted magnetic recording and reproducing device comprising:
a heat assisted magnetic recording head which comprises a main pole, a near-field transducer generating near-field light, a waveguide transmitting light to the near-field transducer, and a light source supplying light to the waveguide;

a heat assisted magnetic recording medium which comprises a lubricant layer on a recording surface facing the heat assisted magnetic recording head;

a head position controller maintaining the heat assisted magnetic recording head in an on-track state;

a data recording current controller controlling a data recording current to be applied to the heat assisted magnetic recording head;

a light source drive current controller controlling a light source drive current to be applied to the light source; and a lubricant-cured material generation processor performing a process of applying the light source drive current to the light source and generating a lubricant-cured material at a distal portion of the near-field transducer while controlling the data recording current below a threshold value.

8. The heat assisted magnetic recording and reproducing device of claim 7, wherein
the threshold value is in a range from 0 to 17 mA.

9. The heat assisted magnetic recording and reproducing device of claim 7, wherein
the threshold value is 0.

* * * * *